United States Patent
Griffin

(10) Patent No.: US 10,536,466 B1
(45) Date of Patent: Jan. 14, 2020

(54) RISK ASSESSMENT OF ELECTRONIC COMMUNICATION USING TIME ZONE DATA

(71) Applicant: Branch Banking and Trust Company, Winston-Salem, NC (US)

(72) Inventor: Jeffrey Jason Griffin, Garner, NC (US)

(73) Assignee: Branch Banking and Trust Company, Winston-Salem, NC (US)

(*) Notice: Subject to any disclaimer, the term of this patent is extended or adjusted under 35 U.S.C. 154(b) by 210 days.

(21) Appl. No.: 15/498,171

(22) Filed: Apr. 26, 2017

(51) Int. Cl.
*H04L 29/06* (2006.01)
*G06F 16/29* (2019.01)
*G06F 16/951* (2019.01)

(52) U.S. Cl.
CPC ............ *H04L 63/107* (2013.01); *G06F 16/29* (2019.01); *G06F 16/951* (2019.01); *H04L 63/04* (2013.01); *H04L 63/08* (2013.01); *H04L 63/1433* (2013.01); *H04L 2463/082* (2013.01)

(58) Field of Classification Search
CPC ... H04L 63/107; H04L 63/04; H04L 63/1433; H04L 63/08; H04L 2463/082; G06F 16/951; G06F 16/29
USPC .......................................................... 726/7
See application file for complete search history.

(56) References Cited

U.S. PATENT DOCUMENTS

| | | | | |
|---|---|---|---|---|
| 7,836,041 B1* | 11/2010 | Jain | ...................... | G06F 16/951 707/706 |
| 7,948,832 B1* | 5/2011 | Luo | ...................... | G06Q 10/109 368/21 |
| 8,065,233 B2* | 11/2011 | Lee | ...................... | G06Q 20/04 705/36 R |
| 8,683,052 B1* | 3/2014 | Brinskelle | ........... | H04L 63/0823 709/228 |
| 9,602,574 B1* | 3/2017 | Mocanu | .................. | H04L 67/02 |
| 9,633,322 B1* | 4/2017 | Burger | ............... | G06Q 10/0635 |

(Continued)

OTHER PUBLICATIONS

Weigold, Thomas; Hiltgen, Alain. Secure Confirmation of Sensitive Transaction Data in Modern Internet Banking Services. 2011 World Congress on Internet Security (WorldCIS—2011). https://ieeexplore.ieee.org/stamp/stamp.jsp?tp=&arnumber=5749897 (Year: 2011).*

(Continued)

*Primary Examiner* — Jeremiah L Avery
(74) *Attorney, Agent, or Firm* — Kilpatrick Townsend & Stockton LLP

(57) ABSTRACT

A network interface device can (i) detect electronic communications from a telecommunications network; (ii) extract an access request for protected data; and (iii) extract browser information about a browser on a user device used by a user to initiate the access request. The access request can include a network address of a device from which the electronic communications were transmitted. The browser information can indicate a time zone associated with the browser. The network address and the browser information can be independent of data about the user and of data transmitted from the network interface device. The network address and stored data about network addresses can be used to determine a time zone for the device. A result of comparing the time zones can be used to determine a level of authentication to require before allowing the protected data to be transmitted to the user device.

20 Claims, 5 Drawing Sheets

(56) References Cited

U.S. PATENT DOCUMENTS

| | | | | |
|---|---|---|---|---|
| 9,832,833 | B1* | 11/2017 | Pipe-Mazo | H05B 33/0854 |
| 10,187,369 | B2* | 1/2019 | Caldera | H04L 63/08 |
| 2003/0212594 | A1* | 11/2003 | Hogan | G06Q 30/0251 |
| | | | | 705/14.49 |
| 2006/0282660 | A1* | 12/2006 | Varghese | G06Q 20/341 |
| | | | | 713/155 |
| 2007/0244987 | A1* | 10/2007 | Pedersen | H04L 67/06 |
| | | | | 709/217 |
| 2008/0250128 | A1* | 10/2008 | Sargent | H04L 41/22 |
| | | | | 709/223 |
| 2009/0037763 | A1* | 2/2009 | Adhya | H04L 12/4641 |
| | | | | 714/4.12 |
| 2009/0037998 | A1* | 2/2009 | Adhya | G06Q 20/027 |
| | | | | 726/11 |
| 2009/0089869 | A1* | 4/2009 | Varghese | G06F 21/31 |
| | | | | 726/7 |
| 2010/0004965 | A1* | 1/2010 | Eisen | G06O 10/00 |
| | | | | 705/318 |
| 2010/0306832 | A1* | 12/2010 | Mu | G06F 21/552 |
| | | | | 726/5 |
| 2011/0047608 | A1* | 2/2011 | Levenberg | H04L 63/0807 |
| | | | | 726/7 |
| 2011/0185425 | A1* | 7/2011 | Lee | H04L 29/12066 |
| | | | | 726/23 |
| 2012/0064891 | A1* | 3/2012 | Wijayanathan | H04W 4/021 |
| | | | | 455/435.1 |
| 2013/0100863 | A1* | 4/2013 | Guerra | H04L 12/1407 |
| | | | | 370/259 |
| 2013/0212420 | A1* | 8/2013 | Lawson | G05B 19/4185 |
| | | | | 713/400 |
| 2014/0089243 | A1* | 3/2014 | Oppenheimer | G06F 21/50 |
| | | | | 706/46 |
| 2014/0164178 | A1* | 6/2014 | Adjaoute | G06Q 30/0609 |
| | | | | 705/26.35 |
| 2014/0192624 | A1* | 7/2014 | Ono | G04R 20/18 |
| | | | | 368/46 |
| 2014/0197234 | A1* | 7/2014 | Hammad | G06Q 30/06 |
| | | | | 235/379 |
| 2014/0283061 | A1* | 9/2014 | Quinlan | H04L 63/1408 |
| | | | | 726/23 |
| 2014/0310779 | A1* | 10/2014 | Lof | H04L 63/0421 |
| | | | | 726/4 |
| 2014/0344891 | A1* | 11/2014 | Mullick | H04L 63/0272 |
| | | | | 726/1 |
| 2015/0039513 | A1* | 2/2015 | Adjaoute | G06Q 20/4016 |
| | | | | 705/44 |
| 2015/0067866 | A1* | 3/2015 | Ibatullin | G06F 21/554 |
| | | | | 726/25 |
| 2015/0170208 | A1* | 6/2015 | Karamchedu | G06Q 30/0264 |
| | | | | 705/14.61 |
| 2015/0264531 | A1* | 9/2015 | Kim | H04W 4/12 |
| | | | | 455/414.3 |
| 2015/0381452 | A1* | 12/2015 | Deen | H04L 67/10 |
| | | | | 709/224 |
| 2016/0019546 | A1* | 1/2016 | Eisen | G06O 20/4016 |
| | | | | 705/44 |
| 2016/0180083 | A1* | 6/2016 | Costigan | G06F 21/55 |
| | | | | 726/23 |
| 2017/0012988 | A1* | 1/2017 | Turgeman | H04L 67/28 |
| 2017/0156124 | A1* | 6/2017 | Ashley, Jr. | H04W 64/00 |
| 2017/0331828 | A1* | 11/2017 | Caldera | G06F 21/316 |
| 2018/0035292 | A1* | 2/2018 | Soundararajan | H04W 12/06 |
| 2018/0097790 | A1* | 4/2018 | Caldera | H04L 63/08 |
| 2018/0109507 | A1* | 4/2018 | Caldera | G06F 21/31 |
| 2018/0288043 | A1* | 10/2018 | Sims | H04L 63/102 |

OTHER PUBLICATIONS

Cashion, Jeffrey; Bassiouni, Mostafa. Protocol for Mitigating the Risk of Hijacking Social Networking Sites. 7th International Conference on Collaborative Computing: Networking, Applications and Worksharing. https://ieeexplore.ieee.org/stamp/stamp.jsp?tp=&arnumber=6144818 (Year: 2011).*

Guan, Zhi et al. Mobile Browser As a Second Factor for Web Authentication. 2011 IEEE Ninth International Symposium on Parallel and Distributed Processing with Applications. https://ieeexplore.ieee.org/stamp/stamp.jsp?tp=&arnumber=5951918 (Year: 2011).*

* cited by examiner

RISK ASSESSMENT OF ELECTRONIC COMMUNICATION USING TIME ZONE DATA

TECHNICAL FIELD

The present disclosure relates generally to information security and user authentication and, more particularly (although not necessarily exclusively), to determining a risk assessment of electronic communication using time zone data.

BACKGROUND

An online service can perform various levels of authentication of an electronic communication or of a user prior to allowing the user to access data from an internal system of the online service. The various levels of authentication can be selected based on the risk of the user or the sensitivity of information that can be accessed by the user being successfully authenticated. One level may involve requiring a correct username and password to be received electronically from the user. Another level may be to require receiving a code transmitted in an out-of-band channel to the user according to stored contact information for the user. A further level may involve asking the user for answers to questions developed based on third-party sources, such as government or private databases listing prior addresses associated with an identity of the user.

But the risk of fraud still exists as personal data usable to overcome these authentication levels may be accessible to unscrupulous individuals. Furthermore, cyber-attacks from foreign-based individuals are a problem. These individuals may use proxy servers to appear as if electronic communications from user devices are originating from the proxy servers, rather than the user devices. In combination with that and personal data about the user that may be known, these unscrupulous individuals may be able to overcome authentication levels and fraudulently access data. Moreover, determining a proper level of authentication can be challenging. Authentication processes that are too involved may deter legitimate users from benefiting from accessing a system, while processes that are too limited may increase risk of fraudulent activity.

SUMMARY

Aspects and examples are disclosed for performing a risk assessment of electronic communication using time zone data.

In some aspects, a method is disclosed. The method can include detecting, by a network interface device, one or more electronic communications from a telecommunications network and extracting an access request for protected data from the one or more electronic communications. The access request can include a network address of a device from which the one or more electronic communications are received. The method can further include extracting, by the network interface device, browser information from the one or more electronic communications in response to a command transmitted to the telecommunications network. The browser information can be about a browser on a user device used by a user to initiate the access request and indicating a first time zone associated with the browser. The network address and the browser information can be independent of data about the user and of data transmitted from the network interface device. The method can further include using the network address of the device and stored data about network addresses to determine a second time zone for the device. The method can further include using a result of comparing the first time zone and the second time zone to determine a level of authentication to require for the one or more electronic communications before allowing the protected data to be transmitted to the user device.

In additional or alternative aspects, a system is disclosed. The system can include a network interface device, a processing device, and a memory device. The network interface device can be communicatively coupled to a telecommunications network. The network interface device can receive one or more electronic communications from the telecommunications network. The network interface can also extract an access request for protected data from the one or more electronic communications. The access request can include a network address of a device from which the one or more electronic communications are received. The network interface device can also extract information from the one or more electronic communications in response to a command transmitted to the telecommunications network. The information can be about a first time zone associated with the user device. The network address and the information can be independent of data about the user and data transmitted from the network interface device. The processing device can be communicatively coupled to the network interface device. The memory device can include instructions for causing the processing device to use the network address of the device and stored data about network addresses to determine a second time zone for the device. The instructions can further be for causing the processing device to use a result of comparing the first time zone and the second time zone to determine a level of authentication to require from the user before allowing the protected data to be transmitted to the user device.

In additional or alternative aspects, a non-transitory computer-readable medium in which instructions are stored can be disclosed. The instructions can be executed by a processing device for causing the processing device to receive an access request for protected data from a network interface device communicatively coupled to a telecommunications network for detecting one or more electronic communications and extracting the access requests from the one or more electronic communications. The access request can include a network address of a device from which the electronic communication is received by the network interface device. The instructions can be executed by the processing device for further causing the processing device to receive browser information from the network interface device. The browser information extracted from the one or more electronic communications in response to a command transmitted to the telecommunications network. The browser information can be about a browser on a user device used by a user to initiate the access request and indicating a first time zone associated with the browser. The network address and the browser information can be independent of data about the user and of data transmitted from the network interface device. The instructions can be executed by the processing device for further causing the processing device to use the network address of the device and stored data about network addresses to determine a second time zone for the device. The instructions can be executed by the processing device for further causing the processing device to use a result of comparing the first time zone and the second time zone to determine a level of authentication to require for the one or more electronic communications before allowing the protected data to be transmitted to the user device.

These illustrative examples are mentioned not to limit or define the invention, but to aid understanding thereof. Other aspects, advantages, and features of the present invention will become apparent after review of the entire description and figures, including the following sections: Brief Description of the Figures, Detailed Description, and Claims.

DETAILED DESCRIPTION

Figure 1:
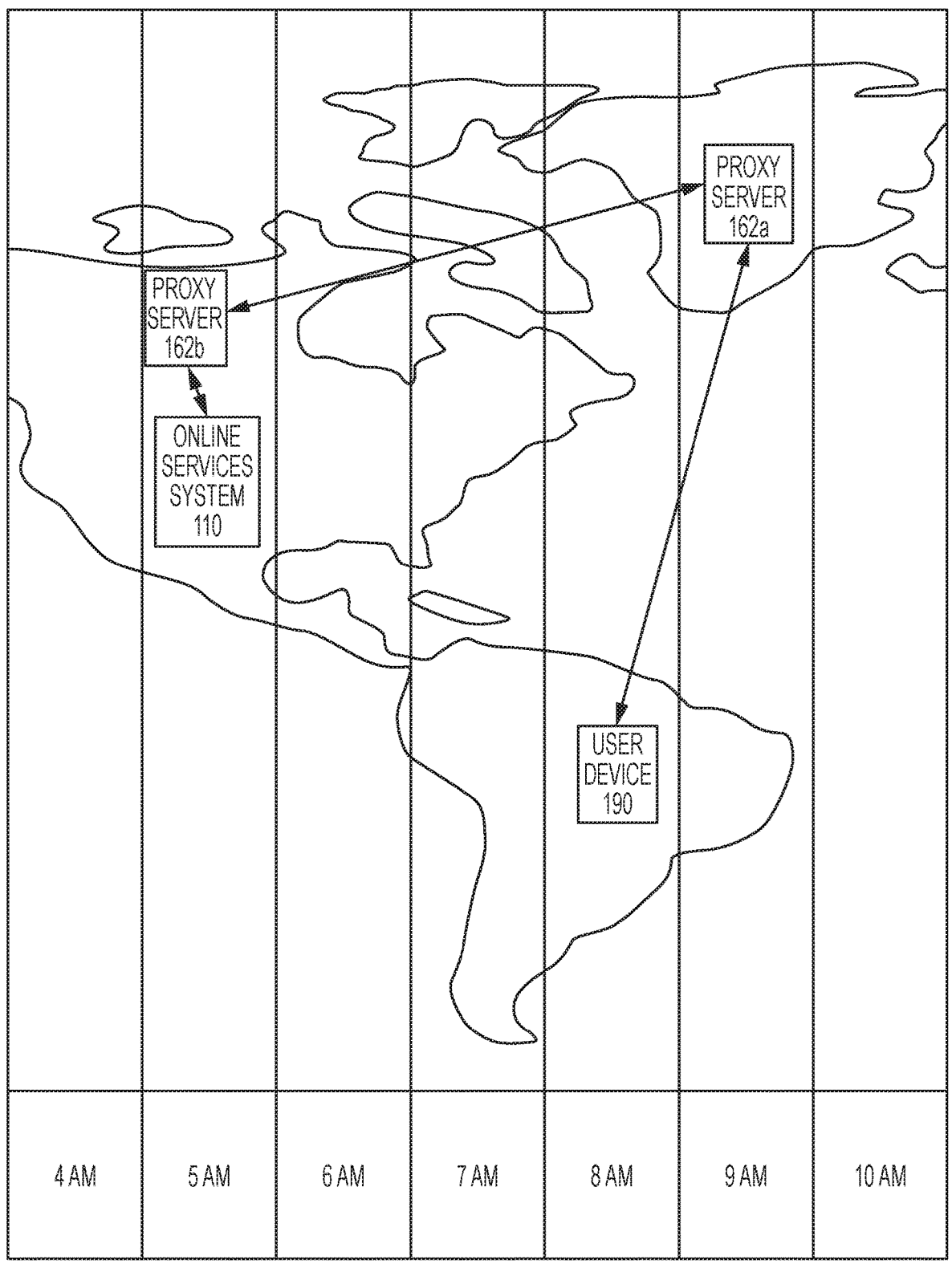
FIG. 1 is a schematic diagram of an example of a portion of a world map with a location of an online services system for receiving communications from a user device via a proxy server according to one aspect of the present disclosure.

Certain aspects and examples of the present disclosure relate to performing a risk assessment of electronic communication using time zone data. An online services system can determine that a user seeking to access an internal subsystem of the online services system has an increased risk level based on the user seeking to remain anonymous. In some aspects, a user can seek to remain anonymous by using a user device to communicate with the online services system via intermediate devices or proxy servers. The online services system can communicate directly with a proxy server and the proxy server can communicate with the user device. The online services system can detect that a proxy server is being used based on a mismatch between a time zone of the user device and a time zone of the proxy device. In response to detecting the mismatch in time zones, the online services system can increase the risk level of the user associated with the user device and request additional authentication from the user prior to allowing the user access to the internal subsystem.

In some aspects, an online services system receives a network address (e.g., an internet protocol ("IP") address) from the proxy server such that the online service system can transmit signals to the proxy server. A network address for a device can be based on a location (e.g., a geolocation) of the device at the time the network address is generated. The online services system can determine the location of the proxy device based on the network address of the proxy server.

In additional or alternative aspects, the online services system can determine a location of the user device based on local time data associated with the user device. The user device can use a software application or interface (e.g., a web browser) to communicatively couple with a network (e.g., a telecommunications network) that includes the proxy server. The interface can include information such as a resolution or size of a window being used to display information received from the network as well as a local time of the user device. In some examples, the online services system can scrape data from the interface by querying the interface. The online services system can use the local time of the user device to determine a time zone that the user device is located. In additional or alternative examples, the online services system can request information from the user device about the local time of the user device or the time zone that the user device is located.

The online service system can improve network security by increasing a risk level of users based on a difference between a time zone of the user device and a time zone of the proxy device. In some aspects, the online services system can compare the difference to a threshold value such that a mismatch that exceeds the threshold value results in an increased risk level. In additional or alternative aspects, the amount of increased risk level can be based on a location of the proxy server or potential locations of the user device within the time zone of the user device. The online services system can also reduce processing power and memory consumption by reducing a risk level for a user in response to determining the time zone associated with the network address and the time zone associated with the local time data match.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 depicts a schematic diagram of an online services system 110 that can receive communications from a user device 190 via proxy servers 162a-b. The proxy servers 162a-b can include any proxy devices that act as an intermediary for communications between the user device 190 and the online services system 110. The online services system 110, the proxy servers 162a-b, and the user device 190 can each be communicatively coupled by a public network (e.g., the Internet). The user device 190 can create a virtual private network ("VPN") between the user device 190 and the online services system 110 by implementing point-to-point connections between the user device 190 and the proxy server 162a, between the proxy server 162a and the proxy server 162b, and between the proxy server 162b and the online services system 110. Communicating with the online services system using the proxy servers 162a-b can allow the user device 190 a greater level of anonymity than the proxy server 162b, which may be communicating directly with the online services system 110. For example, the online services system 110 can receive information (e.g., an internet protocol ("IP") address) about the proxy server 162b from the proxy server 162b that allows the online service system to transmit a signal to the proxy server 162b. The proxy server 162b can receive information about the proxy server 162a to allow the proxy server 162b to communicate with proxy server 162a, but the proxy server 162b may have no information about the user device 190.

The online services system 110 can determine a time zone in which the proxy server 162b is located based on an IP address of the proxy server 162b. In some aspects, IP addresses are generated with a portion or a subnet that is predetermined based on a geolocation of the device associated with the IP address. The online services system 110 can use the subnet of the IP address to determine a geolocation of the proxy server 162*b*. For example, the online services system 110 can include a database linking subnets with a geolocation. The online services system 110 can query the database to determine the geolocation of the proxy server 162*b* is the geolocation linked with the subnet of the IP address of the proxy server 162*b*. The online service system 110 can further determine a time zone that includes the geolocation. In FIG. 1, the proxy server 162*b* is located in coordinated universal time ("UTC")-7.

The online services system 110 can also determine a time zone in which the user device 190 is located based on time data associated with the user device. The user device 190 can include an interface (e.g., a browser) or a software application for retrieving, transmitting, and displaying electronic data communicated across a network. The online service system 110 can scrape data from the interface including a resolution being displayed by the browser, a size of the window being used to display the browser, cookies stored by the browser from visiting web sites, and the time data of the user device. The time data can include a local time of the user device. The online services system 110 can use the local time of the user device to determine the time zone that the user device is located. In FIG. 1, the user device 190 is located in UTC-4, but the user device 190 can be located in any time zone.

The online services system 110 can compare the time zone in which the proxy server is located and the time zone in which the user device is located. The difference in the time zones can indicate that the online services system 110 is not communicating directly with the user device 190. The online services system 110 can determine that the communications with the user device 190 are passing through one or more proxy servers 162*a-b* as part of a VPN. In some aspects, the online services system 110 can determine that the user associated with the user device 190 has an increased risk based on the user using a VPN and seeking anonymity. In additional or alternative aspects, the online services system 110 can request additional authentication data from the user device to verify the user associated with the user device is authorized to access an internal subsystem of the online services system 110.

Although FIG. 1 depicts two proxy servers 162*a-b*, any number of proxy servers can be used as intermediate servers. In some aspects, the user device 190 can communicate directly with the online services system 110. The online services system 110 can determine the IP address of the user device 190 and the time zone determined from the IP address match the time zone determined from the local time data. In additional or alternative aspects, the online services system 110 can determine the user device 190 has a reduced risk based on the lack of a time zone mismatch.

Figure 2:
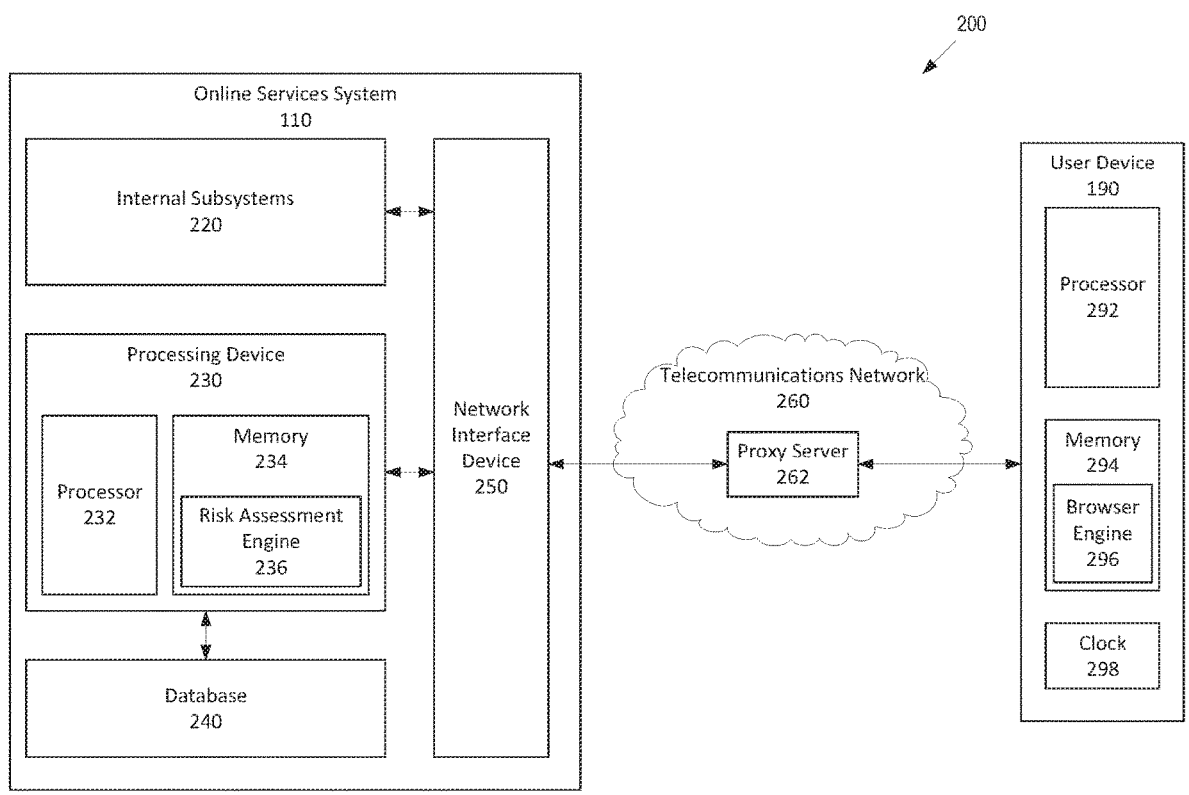
FIG. 2 is a block diagram of an example of a network environment including an online services system for performing a risk assessment of electronic communication using time zone data according to one aspect of the present disclosure.

Various aspects of the present disclosure may be implemented in various environments. FIG. 2 is a block diagram depicting a network environment 200 including the online services system 110 from FIG. 1 communicatively coupled to the user device 190 from FIG. 1. The online services system 110 can be communicatively coupled to the user device 190 by a telecommunications network 260 (e.g., the Internet) including a proxy server 262.

The user device 190 may represent one or more user devices communicatively coupled to the online services system 110 via the telecommunications network 260. The user device 190 can include a processor 292, memory 294, and a clock 298. The memory 294 can include a browser engine that can be executed by the processing device to generate a web browser for communicating electronic data across the telecommunications network 260 to the online services system 110. In some aspects, the browser can access the clock 298 such that the browser includes local time data for the user device 190. The user device 190 can include a computing device, such as a laptop, mobile phone, desktop computer, personal digital assistant, tablet, etc., that may display content in a web browser or other user interface.

The online services system 110 includes a network interface device 250 (e.g., an edge node) communicatively coupled to a processing device 230 and an internal subsystem 220. The network interface device 250 can include a network card or other device communicatively coupled to the telecommunications network 260 to allow user devices, such as the user device 190, to communicate with the online services system. In some aspects, the network interface device 250 can allow authorized user devices to access the internal subsystems 220, which can include a user account for using the online services (e.g., banking services).

The processing device 230 may include any number of processors 232 for executing instructions stored in the memory 234. In some aspects, the processing device 230 can be a dedicated processing device for determining a risk level of a user associated with the user device 190 based on a time zone mismatch. In additional or alternative aspects, the processing device 230 can request authentication data from the user device 190 and determine if the user device 190 is authorized to access the internal subsystems 220. Non-limiting examples of the processor 232 include a field-programmable gate array, an application-specific integrated circuit ("ASIC"), and a microprocessor. The memory 234 can include a storage device that retains information when powered off. Non-limiting examples of the memory 234 can include electrically erasable and programmable read-only memory, a flash memory, or any other type of non-volatile memory.

In some examples, at least a portion of the memory 234 may include a computer-readable medium from which the processor 232 can read instructions of the memory 234. A computer-readable medium may include electrical, optical, magnetic, or other storage devices capable of providing the processor 232 with computer-readable instructions or other program code. Non-limiting examples of a computer-readable medium include magnetic disks, memory chips, read-only memory, random-access memory, an ASIC, a configured processor, optical storage, or any other medium from which the processor 232 may read instructions. The instructions may include processor-specific instructions generated by a compiler or an interpreter from code written in any suitable computer-programming language, including, for example, C, C++, C#, COBOL, Java, etc.

The instructions in the memory 234 can include a risk assessment engine 236. The risk assessment engine 236 can include instructions to cause the processor 232 to perform operations disclosed herein. In some aspects, the operations can include determining a risk level of the user associated with the user device 190 based on a time zone mismatch.

The processing device 230 can determine a time zone associated with the user device 190 based on time data for the user device 190. The processing device 230 can scrape data including local time data (based on the clock 298) from the browser generated by the processor 292 in the user device 190. The processing device 230 can scrape data from the browser by transmitting a request for the browser data from the user device 190 and receiving the browser data in response. The processing device 230 can determine the time zone of the user device 190 based on the local time of the user device 190. The processing device 230 can determine a time zone for the proxy server 262 based on an IP address of the proxy server 262.

The IP address and the browser data can be independent of data about the user and of data transmitted from the network interface device. For example, the IP address of the proxy server 262 can be included in electronic communications transmitted by the proxy server 262 to the network interface device 250 so that the network interface device 250 has an address to transmit responses. The browser data can be data accessible by the browser that is unrelated or unaffected by the data or characteristics of the user. The browser data can also be independent of the data transmitted from the network interface device 250 in that none of the data transmitted from the network interface device 250 may be used in forming the browser data. For example, the browser may have access to a limited amount of information about the user device 190 that allow the browser to interface with various networks using different communication protocols. Some communication protocols may require use of a local time in transmitting messages. The network interface device 250 may transmit an electronic communication including a series of packets to the user device 190. Some of the packets may instruct the user device 190 to request authentication data from the user. Additional packets may request browser data including the local time from the browser. The local time can be accessed by the browser independently of the user, regardless of the authentication data or other data provided by the user, and regardless of the information included in the electronic communication from the network interface device 250. The user device 190 can respond by transmitting an electronic communication including a series of packets to the network interface device 250. Some of the packets may include authentication data associated with the user. Additional packets may include the browser data.

The processing device 230 can compare the time zone of the user device 190 and the time zone of the proxy server 262 to determine a time zone mismatch. The processing device 230 can determine that the user associated with the user device 190 has is an increased level of risk due the mismatch indicating that the user is seeking to remain anonymous and has above average computer networking skills.

The online services system 110 can also include a database 240. The database 240 can include a single database or multiple databases including information to facilitate the processing device 230 determining a time zone that the proxy server 262 is located based on an IP address of the proxy server 262. In some aspects, a portion of an IP address can be predetermined based on a location of a device. The database 240 can include a table that associated IP addresses with a geolocation. The geolocation can be a location of the proxy server 262 when the IP address was assigned to the proxy server 262. Each of the locations can be linked to a time zone in which the physical location is located.

Figure 3:
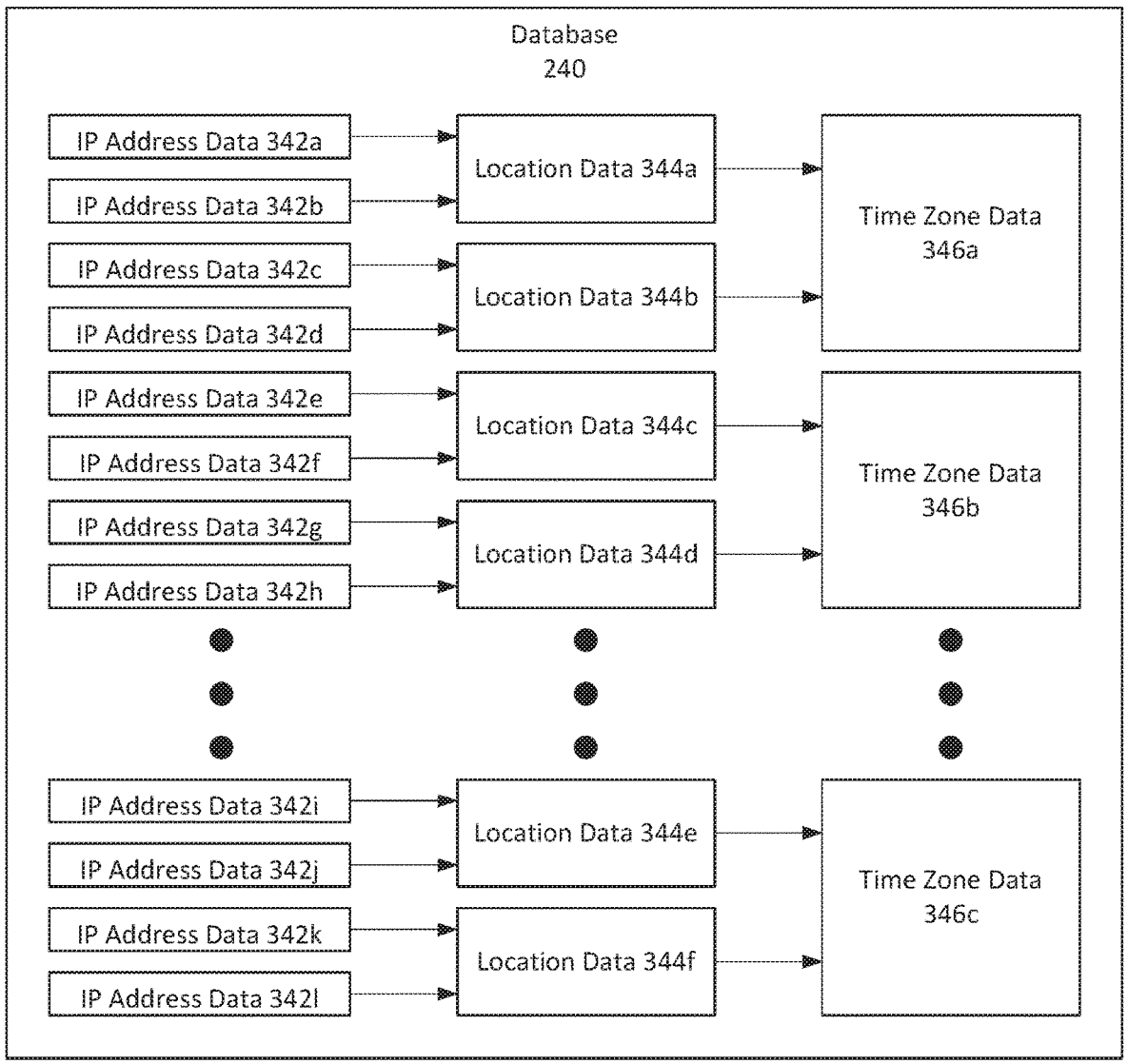
FIG. 3 is a block diagram of an example of a database for storing a time zone associated with a specific internet protocol address according to one aspect of the present disclosure.

FIG. 3 is a block diagram depicting memory locations in the database 240 of FIG. 2. The database 240 can include a plurality of memory locations for IP address data 342*a-l*, location data 344*a-f*, and time zone data 346*a-c*. In some aspects, the IP address data 342*a-l* can each be a portion (e.g., a subnet) of an IP address that was generated based on a location of the device using the IP address. The memory location for each IP address data 342*a-l* can be linked (e.g., can include a pointer) to the memory location that stores the location data 344*a-f* associated with the location of the device associated with the IP address data 342*a-l*. Each of the memory locations for the location data 344*a-f* can be linked to a memory location for time zone data 346*a-c* that indicates a time zone in which a geolocation associated with the location data 344*a-f* is located.

In some aspects, the memory locations may be linked using pointers, objects, or other means for associating information in the database 240. The information stored in the database 240 may be separated or partitioned by information type to allow a processing device to query the memory locations for IP address data 342*a-l* based on an IP address of a proxy server. The database 240 can also provide the processing device with the links to determine location data 344*a-f* and time zone data 346*a-c* associated with the IP address. Although the database 240 is depicted as a single database in FIG. 3, the database 240 may include multiple databases including associated memory locations. The database 240 can be included in an online services system or the databased 240 can be an independent database communicatively coupled to the online services system.

Figure 4:
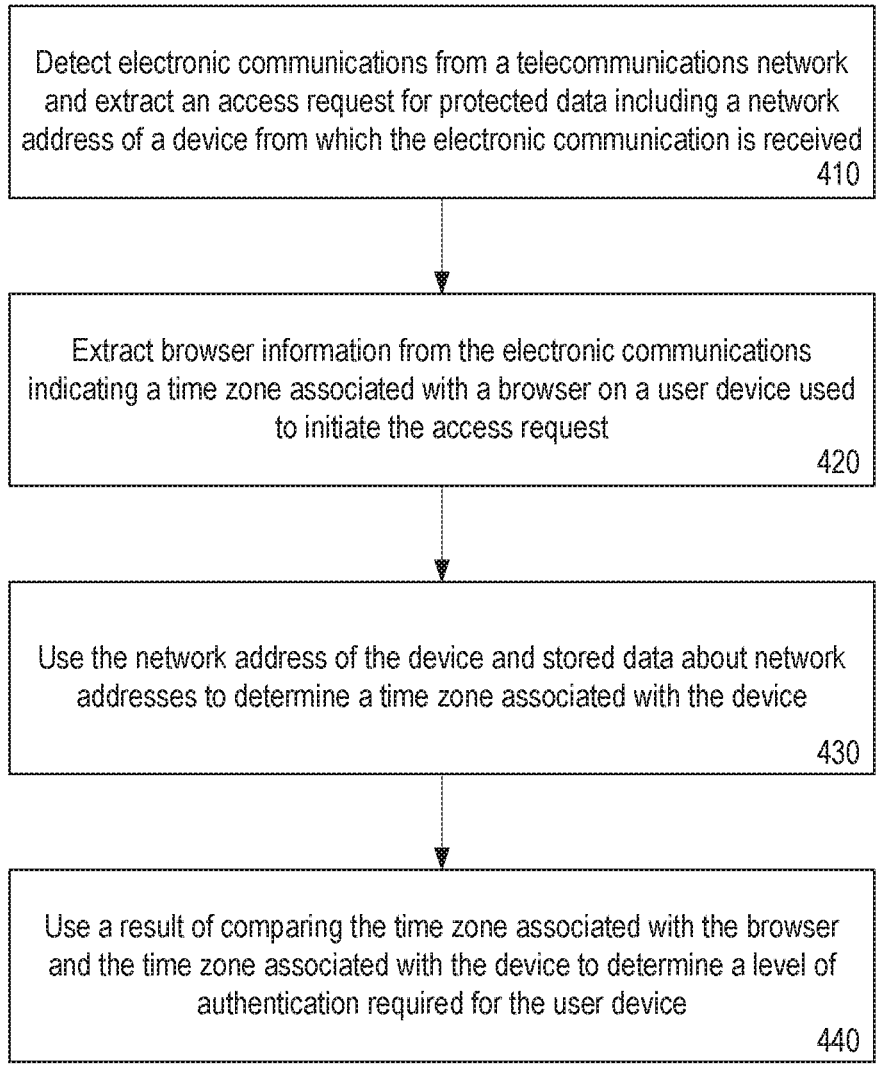
FIG. 4 is a flow chart of an example of a process for performing a risk assessment of electronic communication using time zone data according to one aspect of the present disclosure.

FIG. 4 is a flow chart of a process of performing a risk assessment of electronic communications using time zone data. The process is described below as performed by the processing device 230 in FIG. 2, but other implementations are possible. Performing the risk assessment can include determining a risk level for the user based on a time zone mismatch and can improve system security, reduce processing power and memory consumption used by unauthorized users, and increase the speed of the system for low risk users.

In block 410, the processing device 230 detects electronic communications from a telecommunications network 260. The processing device 230 extracts an access request for protected data from the electronic communications. The access request can include a network address of a proxy server 262 (or another proxy device) form which the electronic communications are received. The processing device 230 can receive the electronic communications from the user device 190 via the proxy server 262 as part of a request from the user device 190 to access the internal subsystem 220 (e.g., a user account) of the online services system 110 (e.g., a financial services provider).

In some examples, the processing device 230 may determine an initial risk level for a user associated with the user device 190 and determine an initial authentication process for authorizing the user device 190 to access the internal subsystems 220. The initial risk level may assume that the user device 190 includes the proxy server 262 and that online services system 110 is communicating directly with the user device 190.

In additional or alternative examples, the processing device 230 may transmit a request first-level authentication as part of an electronic communication to the user device 190 via the proxy server 262. The processing device 230 can receive first-level authentication data in response to the request. The processing device 230 can increase the risk level of the user device 190 in response to determining that the received first-level authentication data is incorrect. Alternatively, the processing device 230 can begin the risk assessment based on time zone data based on determining the first-level authentication data is correct.

In block 420, the processing device 230 extracts browser information from the electronic communications indicating a time zone associated with a browser on the user device 190 used to initiate the access request. The processing device 230 can scrape data from an interface being used by the user device 190 to communicate the electronic data with the online services system 110. The interface can include a web browser with data indicating characteristics (e.g. a resolution or a window size) of a graphical user interface provided to the user and local time data from a clock in the user device. The data can be independent or unrelated to data associated with the user, network interface device 250, any other component of the network environment 200, or the electronic communications received by the browser. The processing device 230 can use the local time data to determine a time zone in which the user device 190 is located.

In some examples, the processing device 230 scrapes the data from the browser by transmitting a request or a command for browser data to the user device 190. In additional or alternative examples, the command for browser data can be independently transmitted or part of another electronic communication such as the request for first-level authentication data.

Although blocks 410, 420 are described above as being performed by the processing device 230, other implementations are possible. In some examples, the network interface device 250 receives the electronic communications from the proxy server 262 and transmits the information extracted from the electronic communications to the processing device 230.

In block 430, the processing device 230 uses the network address of the proxy server 262 and stored data about network address to determine a time zone associated with the device. In some examples, the network address is an IP address. The processing device can use a portion of the IP address to query the database 240 that includes geolocations associated with IP addresses and time zones associated with geolocations. In additional or alternative examples, the processing device 230 can query a first database using the portion of the IP address to determine a geolocation of the proxy server 262 and a second database using the geolocation to determine the time zone of the proxy server 262. In some aspects, the user device 190 can communicate directly with the online services system and the IP address (as well as the time zone) of the proxy server 262 can be the same as the user device 190.

In block 440, the processing device 230 uses a result of comparing the time zone associated with the browser and the time zone associated with the proxy server 262 to determine a level of authentication required for the user device. In some examples, the processing device 230 determines a risk level for the user device based on the magnitude of the difference between the first time zone and the second time zone. In additional or alternative examples, the processing device 230 can adjust the risk level based on the magnitude of the difference or by a predetermined amount if the difference exceeds a threshold amount.

In additional or alternative examples, the processing device 230 can prevent the user device 190 from accessing the internal subsystem 220 of the online services system 110 and request additional authentication from the user associated with the user device 190. For example, the processing device 230 can request additional authentication based on the user answering personal knowledge questions or verifying a one-time code sent to a trusted device. In some aspects, the user device 190 may not use a proxy server 262 and the difference may be zero. The processing device 230 can reduce or maintain the risk level for a user based on determining that the time zone of the IP address matches the time zone based on the local time data of the user device 190.

Figure 5:
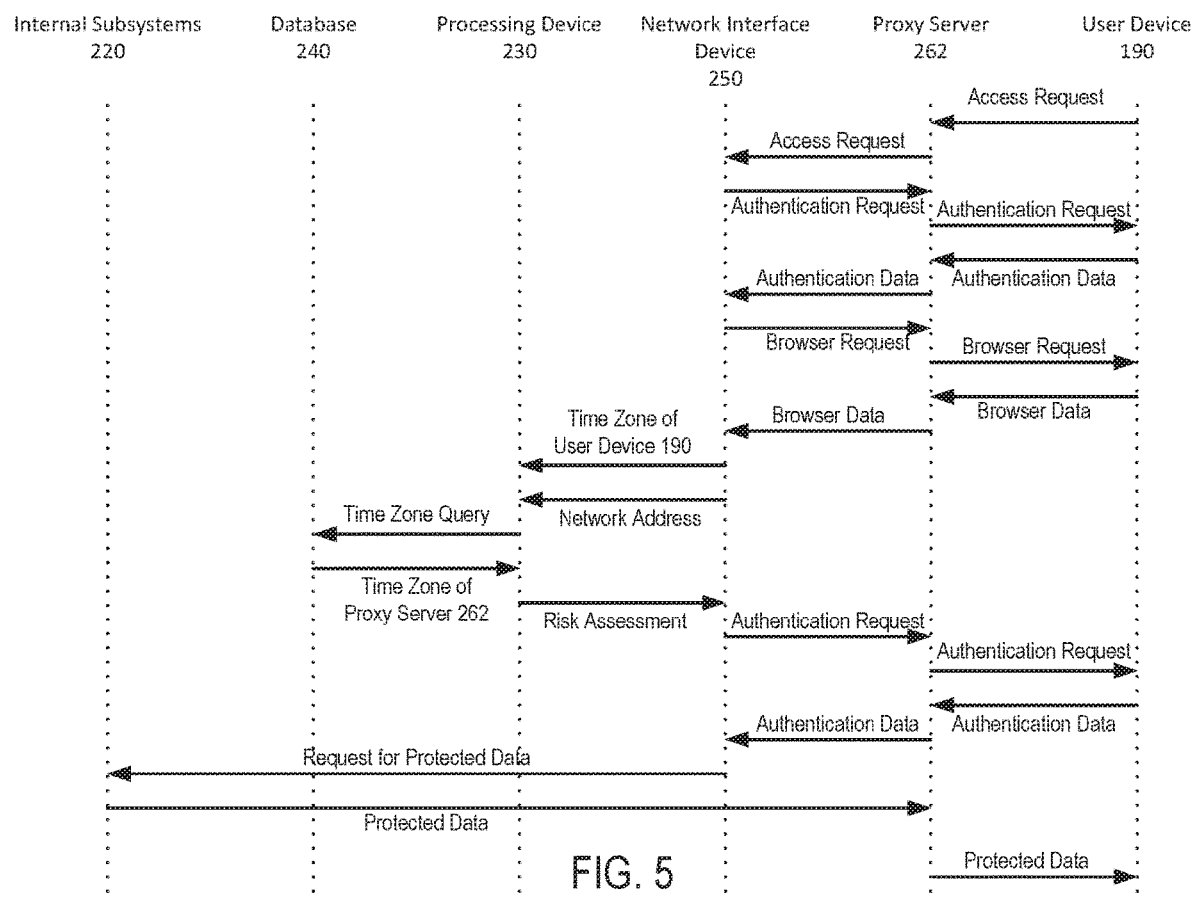
FIG. 5 is a signal flow diagram of an example of authenticating a user device based on a risk assessment of electronic communication using time zone data according to one aspect of the present disclosure.

FIG. 5 is a data flow diagram of an example of authenticating a user device 190 based on a risk assessment of electronic communication using time zone data. The description of FIG. 5 will be made with respect to the block diagram shown in FIG. 2; however, any suitable network environment can be used.

The user device 190 transmits an electronic communication including an access request to the proxy server 262 via a telecommunications network. The proxy server 262 transmits an electronic communication including the access request to the network interface device 250 via the telecommunications network. The network interface device 250 extracts the access request from the electronic communication and transmits a response to the proxy server 262 including a first-level authentication request. The proxy server 262 forwards the first-level authentication request to the user device 190.

The user device 190 responds to the first-level authentication request by transmitting authentication data (e.g., a username and password) to the proxy server 262, which forwards the authentication data to the network interface device 250. In this example, the network interface device 250 can determine the first-level authentication data is correct by comparing the first-level authentication data to a list of authentication data (e.g., a list of usernames and corresponding passwords). In additional or alternative examples, the network interface device 250 transmits the authentication data to the processing device 230 or another component in the online services system 210 to determine that the first-level authentication data is correct. In additional or alternative examples, the network interface device 250 can determine that the first-level authentication data is incorrect and retransmit the first-level authentication request or require a second-level authentication.

In this example, the network interface device 250 transmits a command or a request for browser information to the proxy server 262 in response to determining the first-level authentication data is correct. The request for browser information can be a request for information about a browser on the user device 190 that was used by a user to initiate the access request. In additional or alternative examples, the network interface device 250 can transmit the request for browser information with the first-level authentication request. The browser request is forwarded by the proxy server 262 to the user device 190. The user device 190 transmits the browser information, which includes a local time of geolocation of the user device 190 according to the browser. The browser data is forwarded by the proxy server 262 to the network interface device 250. The network interface device 250 determines a time zone of the user device 190 based on the local time included in the browser data and transmits the time zone to the processing device 230.

In this example, the network interface device 250 also transmits the network address of the proxy server 262 to the processing device in response to determining the first time zone of the user device 190. In additional or alternative examples, the network interface device 250 also transmits the network address (e.g., an IP address) of the proxy server 262 to the processing device 230 in response to determining the first-level authentication data is correct. The processing device 230 can transmit a query to the database 240 to determine a time zone of the proxy server 262. In some examples, the query includes a portion of the network address that was determined based on a geolocation of the proxy server 262 when the network address was assigned to the proxy server 262. The database 240 can store network addresses, a geolocation associated with each network address, and a time zone of each geolocation. The database 240 can look-up the time zone linked to the network address of the proxy server and can transmit the time zone to the processing device 230.

The processing device 230 can determine a risk level of the user device 190 by comparing the time zone of the user device 190 and the time zone of the proxy server 262. In some examples, the greater the magnitude of the difference between the time zones the higher the risk level is set for the user device 190. The results of the risk assessment are transmitted to the network interface device 250. In this example, the network interface device 250 transmits an additional authentication request to the user device 190 via the proxy server 262 based on the risk assessment. The user device 190 transmits additional authentication data to the network interface device 250 via the proxy server 262. The network interface device 250 can verify the additional authentication data and determine the user device is an authorized user device.

In additional or alternative examples, the additional authentication request can be a second-level authentication request or a higher-level authentication request that requires a code transmitted in an out-of-band channel to the user according to stored contact information for the user. In additional or alternative examples, a further level authentication may involve asking the user for answers to questions developed based on third-party sources, such as government or private databases listing prior addresses associated with an identity of the user. In additional or alternative examples, the risk assessment can indicate that the user device 190 is a low risk based on the time zones matching indicating the user device 190 includes the proxy server 262. The network interface device 250 can determine the user device 190 is an authorized user device based on the first-level authentication.

The network interface device 250 transmits a request for protected data from the user device 190 to the internal subsystem 220 based on determining the user device 190 is an authorized user device. The internal subsystem 220 can determine the protected data requested (e.g., account information for the user associated with the user device). In this example, the internal subsystems 220 transmits the protected data to the user device via the proxy server 262. In additional or alternative examples, the internal subsystem 220 transmits the protected data to the network interface device 250, which can forward the protected data to the user device 190 via the proxy server 262.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A method comprising:
   detecting, by a network interface device, one or more electronic communications from a telecommunications network and extracting an access request for protected data from the one or more electronic communications, the access request including an internet protocol address of a proxy device from which the one or more electronic communications are received;
   extracting, by the network interface device, browser information from the one or more electronic communications in response to a command transmitted to the telecommunications network, the browser information being about a browser on a user device used by a user to initiate the access request and indicating a first time zone associated with the browser, the internet protocol address and the browser information being independent of data about the user and of data transmitted from the network interface device;
   using the internet protocol address of the proxy device and stored data about internet protocol addresses to determine a second time zone for the proxy device; and
   determining a risk level for the user device based on a comparison of the first time zone and the second time zone, a geolocation associated with the internet protocol address of the proxy device, and a potential location of the user device in the first time zone;
   wherein the risk level corresponds to a level of authentication to require for the user device before allowing the protected data to be transmitted to the user device.

2. The method of claim 1, further comprising:
   requesting first-level authentication information from the user device in response to extracting the access request;
   receiving the first-level authentication information; and
   determining the risk level in response to receiving the first-level authentication information, wherein determining the risk level further comprises:
      determining an increased risk level for the user device based on the comparison; and
      requesting further-level authentication information from the user device before allowing the protected data to be transmitted to the user device.

3. The method of claim 1, wherein using the internet protocol address of the proxy device and stored data about internet protocol addresses to determine the second time zone for the proxy device comprises:
   determining a portion of the internet protocol address;
   querying a database for the second time zone by transmitting the portion of the internet protocol address to the database, the database storing a plurality of portions of internet protocol addresses, each portion in the plurality of portions of internet protocol addresses being linked to one geolocation of a plurality of geolocations and each geolocation of the plurality of geolocations being associated with one time zone of a plurality of time zones; and receiving the second time zone from the database in response to querying the database.

4. The method of claim 3, further comprising receiving the geolocation associated with the internet protocol address from the database in response to querying the database.

5. The method of claim 1, wherein extracting the browser information from the one or more electronic communications further comprises:

transmitting the command to the user device via the telecommunications network, the command including a request for the browser information, the browser information including a local time of a geolocation of the user device according to the browser; and determining the first time zone of the user device based on the local time.

6. The method of claim 1, further comprising:

requesting, by the network interface device, higher-level authentication from the user device based on the risk level;

receiving, by the network interface device, higher-level authentication data authenticating the user device; and authorizing, by the network interface device and in response to receiving the higher-level authentication data, the access request for protected data to be communicated to the user device.

7. The method of claim 1, wherein the proxy device is the user device, and wherein determining the risk level comprises:

determining that the first time zone is the same as the second time zone; and determining a reduced risk level for the user device and bypassing a requirement for additional authentication from the user device before allowing the protected data to be transmitted to the user device.

8. A system comprising:

a network interface device;

a processing device communicatively coupleable to the network interface device; and a memory device on which instructions are stored for causing the processing device to:

receive one or more electronic communications from a telecommunications network;

extract an access request for protected data from the one or more electronic communications, the access request including an internet protocol address of a proxy device from which the one or more electronic communications are received; and extract browser information from the one or more electronic communications in response to a command transmitted to the telecommunications network, the browser information being about a browser on a user device used by a user to initiate the access request and indicating a first time zone associated with the browser, the internet protocol address and the browser information being independent of data about the user and data transmitted from the network interface device;

use the internet protocol address of the proxy device and stored data about internet protocol addresses to determine a second time zone for the proxy device; and determine a risk level for the user device based on a comparison of the first time zone and the second time zone, a geolocation associated with the internet protocol address of the proxy device, and a potential location of the user device in the first time zone;

wherein the risk level corresponds to a level of authentication to require from the user device before allowing the protected data to be transmitted to the user device.

9. The system of claim 8, wherein the network interface device is communicatively coupleable to an internal subsystem that stores the protected data, wherein the memory device further comprises instructions that are executable by the processing device for causing the processing device to:

request first-level authentication information from the user device in response to extracting the access request;

receive the first-level authentication information; and determine the risk level in response to receiving the first-level authentication information, wherein determining the risk level and further comprises causing the processing device to:

determine an increased risk level for the user device based on the comparison; and request further-level authentication information from the user device for authenticating the user device to allow the user device to communicate with the internal subsystem.

10. The system of claim 8, wherein the instructions for causing the processing device to use the internet protocol address of the proxy device and stored data about internet protocol addresses to determine the second time zone for the proxy device comprise causing the processing device to:

determine a portion of the internet protocol address;

query a database for the second time zone by transmitting the portion of the internet protocol address to the database, the database storing a plurality of portions of internet protocol addresses, each portion in the plurality of portions of internet protocol addresses being linked to one geolocation of a plurality of geolocations and each geolocation of the plurality of geolocations being associated with one time zone of a plurality of time zones; and receive the second time zone from the database in response to querying the database.

11. The system of claim 10, wherein the instructions for causing the processing device to receive the geolocation associated with the internet protocol address from the database in response to querying the database.

12. The system of claim 8, wherein the instructions for causing the processing device to extract the browser information from the one or more electronic communications further comprises causing the processing device to:

transmit the command to the user device via the telecommunications network, the command including a request for the browser information, the browser information including a local time of a geolocation of the user device according to the browser; and determine the first time zone of the user device based on the local time.

13. The system of claim 8, wherein the proxy device is the user device, and wherein determining the risk level comprises causing the processing device to:

determine that the first time zone is the same as the second time zone; and determine a reduced risk level for the user device and bypassing a requirement for additional authentication from the user device before allowing the protected data to be transmitted to the user device.

14. A non-transitory computer-readable medium in which instructions are stored, the instructions being executable by a processing device for causing the processing device to:
- receive an access request for protected data from a network interface device communicatively coupleable to a telecommunications network for detecting one or more electronic communications and extracting the access requests from the one or more electronic communications, the access request including an internet protocol address of a proxy device from which the electronic communication is received by the network interface device;
- receive information from the network interface device, the information extracted from the one or more electronic communications in response to a command transmitted to the telecommunications network, the information indicating a first time zone associated with a user device used by a user to initiate the access request, the internet protocol address and the information being independent of data about the user and of data transmitted from the network interface device;
- using the internet protocol address of the proxy device and stored data about internet protocol addresses to determine a second time zone for the proxy device;
- determine a risk level for the user device based on a comparison between the first time zone and the second time zone, a geolocation associated with the internet protocol address of the proxy device, and a potential location of the user device in the first time zone; and
- wherein the risk level corresponds to a level of authentication to require for the user device before allowing the protected data to be transmitted to the user device.

15. The non-transitory computer-readable medium of claim 14, wherein the instructions are further executable for causing the processing device to:
- request first-level authentication information from the user device in response to receiving the access request;
- receive the first-level authentication information;
- determine the risk level in response to receiving the first-level authentication information, wherein determining the risk level further comprises causing the processing device to:
  - determine an increased risk level for the user device based on the comparison; and
  - request further-level authentication information from the user device before allowing the protected data to be transmitted to the user device.

16. The non-transitory computer-readable medium of claim 14, wherein the instructions for causing the processing device to use the internet protocol address of the proxy device and stored data about internet protocol addresses to determine the second time zone for the proxy device comprise causing the processing device to:
- determine a portion of the internet protocol address;
- query a database for the second time zone by transmitting the portion of the internet protocol address to the database, the database storing a plurality of portions of internet protocol addresses, each portion in the plurality of portions of internet protocol addresses being linked to one geolocation of a plurality of geolocations and each geolocation of the plurality of geolocations being associated with one time zone of a plurality of time zones; and
- receive the second time zone from the database in response to querying the database.

17. The non-transitory computer-readable medium of claim 14,
- wherein the information is browser information, and wherein the instructions for causing the processing device to receive the information from the network interface device further comprises causing the processing device to:
- transmit the command to the user device via the telecommunications network, the command including a request for the browser information, the browser information including a local time of a geolocation of the user device according to a browser of the user device; and
- determine the first time zone of the user device based on the local time.

18. The non-transitory computer-readable medium of claim 14, wherein the instructions are further executable for causing the processing device to:
- request higher-level authentication from the user device based on the risk level;
- receive higher-level authentication data authenticating the user device; and
- authorize the access request for protected data to be communicated to the user device in response to receiving the higher-level authentication data.

19. The non-transitory computer-readable medium of claim 14, wherein the proxy device is the user device, and wherein the instructions for causing the processing device to determine the risk level comprises causing the processing device to:
- determine that the first time zone is the same as the second time zone; and
- determine a reduced risk level for the user and bypassing a requirement for additional authentication from the user device before allowing the protected data to be transmitted to the user device.

20. The non-transitory computer-readable medium of claim 14, wherein the proxy device is different from the user device.

* * * * *